United States Patent
Fukawatase et al.

(10) Patent No.: US 9,327,673 B2
(45) Date of Patent: May 3, 2016

(54) VEHICLE SIDE AIRBAG DEVICE

(75) Inventors: Osamu Fukawatase, Miyoshi (JP); Yusuke Fujiwara, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 14/240,613

(22) PCT Filed: Aug. 31, 2011

(86) PCT No.: PCT/JP2011/069831
§ 371 (c)(1),
(2), (4) Date: Feb. 24, 2014

(87) PCT Pub. No.: WO2013/030995
PCT Pub. Date: Mar. 7, 2013

(65) Prior Publication Data
US 2014/0203542 A1    Jul. 24, 2014

(51) Int. Cl.
*B60R 21/239* (2006.01)
*B60R 21/231* (2011.01)
*B60R 21/2338* (2011.01)

(52) U.S. Cl.
CPC .......... *B60R 21/239* (2013.01); *B60R 21/2338* (2013.01); *B60R 21/23138* (2013.01); *B60R 2021/23146* (2013.01); *B60R 2021/23382* (2013.01)

(58) Field of Classification Search
CPC .............. B60R 21/239; B60R 21/2338; B60R 21/23138; B60R 2021/23146
USPC .................................... 280/730.2, 739, 743.1
See application file for complete search history.

(56) References Cited

U.S. PATENT DOCUMENTS

| | | | |
|---|---|---|---|
| 5,536,038 A | | 7/1996 | Bollaert et al. |
| 6,270,113 B1 * | | 8/2001 | Wipasuramonton et al. ........................ 280/730.2 |
| 6,457,741 B2 * | | 10/2002 | Seki et al. .................. 280/730.2 |
| 7,000,943 B2 * | | 2/2006 | Hasebe et al. ................ 280/729 |
| 7,108,278 B2 * | | 9/2006 | Kai et al. .................... 280/730.2 |
| 7,413,218 B2 * | | 8/2008 | Ekdahl .......................... 280/739 |
| 7,475,906 B2 * | | 1/2009 | Goto et al. ................. 280/743.2 |
| 7,770,921 B2 * | | 8/2010 | Mueller et al. ............... 280/739 |
| 7,819,424 B2 * | | 10/2010 | Toda et al. ................. 280/730.2 |
| 8,297,651 B2 * | | 10/2012 | Kwon et al. ............... 280/730.2 |

(Continued)

FOREIGN PATENT DOCUMENTS

| JP | A-8-225054 | 9/1996 |
|---|---|---|
| JP | A-8-230591 | 9/1996 |

(Continued)

*Primary Examiner* — Barry Gooden, Jr.
(74) *Attorney, Agent, or Firm* — Oliff PLC

(57) ABSTRACT

A vehicle side airbag device with a decreased load on the chest of passenger and an increased initial restraining performance resulting from a side airbag. In the side airbag device, a vent hole portion is formed from the stitching portion between a main panel and a side face panel being interrupted at a portion thereof. Flaps provided to the main panel and the side face panel are inserted from the vent hole portion into the chest chamber. The flaps close off the vent hole portion by means of the internal pressure of the chest chamber until the side airbag inflated and deployed between an occupant and a door trim. When the internal pressure of the chest chamber rise by means of chest chamber being compressed between the occupant and the door trim, the flaps are pushed out of an airbag main body portion, and the vent hole portion is opened.

11 Claims, 13 Drawing Sheets

(56) References Cited

U.S. PATENT DOCUMENTS

| | | | |
|---|---|---|---|
| 8,322,748 B2* | 12/2012 | Abe et al. | 280/739 |
| 8,342,570 B2* | 1/2013 | Higuchi | 280/739 |
| 8,414,023 B2* | 4/2013 | Naganawa et al. | 280/743.2 |
| 8,480,124 B2* | 7/2013 | Rickenbach et al. | 280/730.2 |
| 8,550,495 B2* | 10/2013 | Sato et al. | 280/730.2 |
| 8,714,588 B2* | 5/2014 | Honda | B60R 21/20 280/729 |
| 8,746,736 B2* | 6/2014 | Mendez et al. | 280/736 |
| 8,757,657 B1* | 6/2014 | Hotta et al. | 280/730.2 |
| 8,882,143 B2* | 11/2014 | Williams | D05B 13/00 280/739 |
| 8,960,719 B2* | 2/2015 | Iida et al. | 280/739 |
| 9,120,457 B2* | 9/2015 | Kino | B60R 21/207 |
| 9,180,836 B2* | 11/2015 | Hotta | B60R 21/23138 |
| 2003/0209895 A1 | 11/2003 | Gu | |
| 2004/0130135 A1* | 7/2004 | Ekdahl | 280/739 |
| 2005/0006883 A1* | 1/2005 | Sato et al. | 280/730.2 |
| 2005/0184493 A1* | 8/2005 | Hofmann et al. | 280/730.2 |
| 2005/0218635 A1* | 10/2005 | Wipasuramonton et al. | 280/730.2 |
| 2006/0220358 A1 | 10/2006 | Umehara | |
| 2006/0273563 A1* | 12/2006 | Hasebe et al. | 280/739 |
| 2007/0267854 A1* | 11/2007 | Fukuda et al. | 280/730.2 |
| 2008/0252054 A1* | 10/2008 | Kim et al. | 280/743.2 |
| 2008/0290637 A1 | 11/2008 | Mueller et al. | |
| 2009/0224520 A1* | 9/2009 | Higuchi | 280/740 |
| 2010/0109303 A1 | 5/2010 | Abe et al. | |
| 2011/0193329 A1* | 8/2011 | Higuchi | 280/740 |
| 2012/0181780 A1* | 7/2012 | Rickenbach et al. | 280/730.2 |
| 2013/0234421 A1* | 9/2013 | Honda et al. | 280/729 |
| 2014/0151985 A1* | 6/2014 | Hotta et al. | 280/730.2 |

FOREIGN PATENT DOCUMENTS

| | | |
|---|---|---|
| JP | A-9-11845 | 1/1997 |
| JP | A-2003-327071 | 11/2003 |
| JP | A-2006-281968 | 10/2006 |
| JP | A-2007-50848 | 3/2007 |
| JP | A-2010-137779 | 6/2010 |
| JP | A-2010-535121 | 11/2010 |
| JP | A-2011-126462 | 6/2011 |
| WO | WO 2008/122346 A1 | 10/2008 |
| WO | WO 2008/136336 A1 | 11/2008 |

* cited by examiner

VEHICLE SIDE AIRBAG DEVICE

TECHNICAL FIELD

The present invention relates to a vehicle side airbag device, and in particular relates to a side airbag device provided with a chest chamber that restrains the chest of an occupant, and a waist chamber that restrains the waist of the occupant.

BACKGROUND ART

Patent Document 1 below describes a vehicle side-on collision airbag device in which an airbag main body is formed from left and right side main base cloths, and a side face base cloth that couples together outer peripheral edges of the main base cloths. A discharge hole (vent hole portion) that discharges gas from inside the airbag main body is formed at a front central portion of the side face main cloth.

Patent Document 2 below describes a side airbag formed by stitching together peripheral edge portions of two side panels. An air passage hole (vent hole portion) is formed by interrupting a portion of this stitching.

Patent Document 1: Japanese Patent Application Laid-Open (JP-A) No. H08-225054
Patent Document 2: JP-A No. 2010-535121

DISCLOSURE OF INVENTION

Technical Problem

In order to enhance initial restraint performance of the side airbag, it is necessary to raise the internal pressure of the side airbag during actuation of an inflator. However, it is also necessary to reduce the internal pressure of the side airbag at a location that restrains the chest of the occupant in order to lessen the load from the side airbag received by the chest of the occupant. It has hitherto been difficult to satisfy these two conflicting demands with a simple configuration.

In consideration of the above circumstances, an object of the present invention is to obtain a vehicle side airbag device capable of both enhancing initial restraint performance and lessening the load to the chest of an occupant with a simple configuration.

Solution to Problem

A vehicle side airbag device according to claim 1 includes: a side airbag that is formed with a bag-shaped airbag main body portion by stitching a base cloth, the inside of the airbag main body portion being partitioned into at least a chest chamber and a waist chamber; an inflator that supplies gas to the chest chamber inside and to the waist chamber inside in the event of a vehicle side-on collision, thereby inflating and deploying the side airbag such that the chest chamber is present between the chest of an occupant and a vehicle body side portion, and the waist chamber is present between the waist of the occupant and a vehicle body side portion; a vent hole portion that is provided to the side airbag by interrupting a portion of the stitching, and that places the chest chamber inside in communication with the airbag main body portion outside; and a tongue portion that extends out in a tongue shape from an edge portion of at least one of the base cloths adjacent on each side of the vent hole portion, and that is inserted inside the chest chamber through the vent hole portion.

In the invention according to claim 1, the side airbag is formed with the bag-shaped airbag main body portion by stitching the base cloth, and the inside of the airbag main body portion is partitioned into at least the chest chamber and the waist chamber. In the event of a vehicle side-on collision, gas is supplied to the chest chamber inside and the waist chamber inside by the inflator, such that the side airbag inflates and deploys. The chest chamber is therefore present between the chest of the occupant and the vehicle body side portion, and the chest of the occupant is restrained by the chest chamber. The waist chamber is present between the waist of the occupant and the vehicle body side portion, and the waist of the occupant is restrained by the waist chamber.

Note that in the side airbag described above, the vent hole portion is provided by interrupting a portion of the stitching of the base cloth, and the chest chamber inside is placed in communication with the airbag main body portion outside by the vent hole portion. The tongue shaped tongue portion extends out from the edge portion of at least one of the base cloths adjacent on each side of the vent hole portion. The tongue portion is inserted inside the chest chamber through the vent hole portion, such that the internal pressure of the chest chamber is employed to close off the vent hole portion with the tongue portion during inflation and deployment of the side airbag between the occupant and the vehicle body side portion. The chest chamber and the waist chamber can accordingly be quickly inflated and deployed, thereby enabling initial restraint performance of the side airbag to be enhanced.

However, the side airbag that has inflated and deployed between the occupant and the vehicle body side portion is compressed in the vehicle width direction between the occupant and the vehicle body side portion due to the impact of the side-on collision. This compression causes the internal pressure of the chest chamber and the waist chamber to increase suddenly, enabling a configuration in which the tongue portion is pushed out to the airbag main body portion outside accompanying the increase in the internal pressure of the chest chamber. As a result, closing off of the vent hole portion by the tongue portion is released, opening up the vent hole portion. Gas inside the chest chamber is accordingly expelled to the airbag main body portion outside through the vent hole portion. The internal pressure of the chest chamber can accordingly be decreased, enabling the load from the chest chamber received by the chest of the occupant to be lessened. Moreover, in the present invention the vent hole portion is provided by interrupting a portion of the stitching of the side airbag, and the vent hole portion is closed off and opened up by the tongue portion that extends out from the edge portion of the base cloth, enabling a simple configuration to be achieved.

A vehicle side airbag device according to claim 2 includes: a side airbag that is formed with a bag-shaped airbag main body portion by stitching a base cloth with the inside of the airbag main body portion partitioned into at least a chest chamber and a waist chamber; an inflator that supplies gas to the chest chamber inside and to the waist chamber inside in the event of a vehicle side-on collision, thereby inflating and deploying the side airbag such that the chest chamber is present between the chest of an occupant and a vehicle body side portion, and the waist chamber is present between the waist of the occupant and a vehicle body side portion; a vent hole portion that is provided to the side airbag by interrupting a portion of the stitching, and that places the chest chamber inside in communication with the airbag main body portion outside; and a tongue portion that extends out in a tongue shape from an edge portion of at least one the base cloths adjacent on each side of the vent hole portion, that is inserted inside the chest chamber through the vent hole portion, and that closes off the vent hole portion by internal pressure of the chest chamber due to the gas supplied from the inflator, and that releases the closing off by being pushed out to the outside of the airbag main body portion accompanying an increase in internal pressure of the chest chamber due to the side airbag being compressed in a vehicle width direction in an inflated and deployed state of the side airbag.

In the invention according to claim 2, the side airbag is formed with the bag-shaped airbag main body portion by stitching the base cloth, and the inside of the airbag main body portion is partitioned into at least the chest chamber and the waist chamber. In the event of a vehicle side-on collision, gas is supplied to the chest chamber inside and the waist chamber inside by the inflator, such that the side airbag inflates and deploys. The chest chamber is therefore present between the chest of the occupant and the vehicle body side portion, and the chest of the occupant is restrained by the chest chamber. The waist chamber is present between the waist of the occupant and the vehicle body side portion, and the waist of the occupant is restrained by the waist chamber.

Note that in the side airbag described above, the vent hole portion is provided by interrupting a portion of the stitching of the base cloth, and the chest chamber inside is placed in communication with the airbag main body portion outside by the vent hole portion. The tongue shaped tongue portion extends out from the edge portion of at least one of the base cloths adjacent on each side of the vent hole portion. The tongue portion is inserted inside the chest chamber through the vent hole portion, thereby closing off the vent hole portion by the internal pressure of the chest chamber due to the gas supplied from the inflator. The chest chamber and the waist chamber can accordingly be quickly inflated and deployed, thereby enabling initial restraint performance of the side airbag to be enhanced.

However, after the side airbag has inflated and deployed, the chest chamber and the waist chamber are compressed in the vehicle width direction between the occupant and the vehicle body side portion due to the impact of the side-on collision. This compression causes the internal pressure of the chest chamber and the waist chamber to increase suddenly, such that the tongue portion is pushed out to the airbag main body portion outside accompanying the increase in the internal pressure of the chest chamber. As a result, closing off of the vent hole portion by the tongue portion is released, opening up the vent hole portion. Gas inside the chest chamber is accordingly expelled to the airbag main body portion outside through the vent hole portion. The internal pressure of the chest chamber can accordingly be decreased, enabling the load from the chest chamber received by the chest of the occupant to be lessened. Moreover, in the present invention the vent hole portion is provided by interrupting a portion of the stitching of the side airbag, and the vent hole portion is closed off and opened up by the tongue portion that extends out from the edge portion of the base cloth, enabling a simple configuration to be achieved.

A vehicle side airbag device according to claim 3 is the vehicle side airbag device of either claim 1 or claim 2, wherein: the airbag main body portion is configured by a pair of main base cloths that face each other in a vehicle width direction in an inflated and deployed state of the side airbag, and a side face base cloth that is formed in a belt shape, that has one long side edge portion stitched to a peripheral edge portion of one of the main base cloths, and that has another long side edge portion stitched to a peripheral edge portion of the other main base cloth; and the vent hole portion is formed by interrupting a portion of the stitching between the one main base cloth, that is disposed on the vehicle width direction outside in the inflated and deployed state, and the side face base cloth.

In the invention according to claim 3, the airbag main body portion is formed by stitching the pair of main base cloths and the side face base cloth in what is known as a 3D side airbag. The vent hole portion is formed by interrupting a portion of the stitching between the one main base cloth, that is disposed on the vehicle width direction outside in the inflated and deployed state of the side airbag, and the side face base cloth. Since the vent hole portion is disposed on the vehicle width direction outside similarly to the one main base cloth, namely on the opposite side to the occupant, any effect on the occupant from high temperature gas expelled from the vent hole portion can be alleviated.

A vehicle side airbag device according to claim 4 is the vehicle side airbag device of claim 3, wherein the tongue portions respectively provided to the one main base cloth and the side face base cloth mutually face each other inside the chest chamber.

In the invention according to claim 4, the tongue portions are respectively provided to both the one main base cloth, that is disposed on the vehicle width direction outside in the inflated and deployed state of the side airbag, and to the side face base cloth. The pair of tongue portions are inserted inside the chest chamber through the vent hole portion, and mutually face each other inside the chest chamber. The pair of tongue portions are accordingly superimposed on one another by the internal pressure of the chest chamber during actuation of the inflator. The vent hole portion can accordingly be closed off properly.

A vehicle side airbag device according to claim 5 is the vehicle side airbag device of either claim 1 or claim 2, wherein the airbag main body portion is configured by stitching together peripheral edge portions of a pair of base cloths that face each other in the vehicle width direction in an inflated and deployed state of the side airbag.

In the invention according to claim 5, the airbag main body portion of the side airbag is formed by stitching together the peripheral edges of the pair of base cloths that face each other in the vehicle width direction in the inflated and deployed state of the side airbag, configuring what is known as a 2D side airbag. The vent hole portion is formed by interrupting a portion of the stitching. In the present invention, a simple configuration can accordingly be achieved for the airbag main body portion due to configuring the airbag main body portion from the pair of base cloths.

A vehicle side airbag device according to claim 6 is the vehicle side airbag device of claim 5, wherein the tongue portions respectively provided to the pair of base cloths mutually face each other inside the chest chamber.

In the invention according to claim 6, the tongue portions are respectively provided to the pair of base cloths configuring the airbag main body portion. The pair of tongue portions are inserted inside the chest chamber through the vent hole portion, and mutually face each other inside the chest chamber. The pair of tongue portions are thereby superimposed on one another under the internal pressure of the chest chamber during actuation of the inflator. The vent hole portion can accordingly be closed off properly.

A vehicle side airbag device according to claim 7 is the vehicle side airbag device of claim 1, wherein at least a leading end side of the tongue portion is formed with a semicircular profile.

In the invention of claim 7, at least the leading end side of the tongue portion inserted inside the chest chamber through the vent hole portion is formed with a semicircular profile. Catching of the tongue portion on edge portions of the vent hole portion as the tongue portion is pushed out to the outside of the airbag main body portion accompanying the increase in internal pressure of the chest chamber can accordingly be prevented. The tongue portion can be pushed out smoothly to the outside of the airbag main body portion as a result.

A vehicle side airbag device according to claim 8 is the vehicle side airbag device of claim 4, wherein the tongue portion provided to the side face base cloth is formed shorter than the tongue portion provided to the one main base cloth.

In the invention according to claim 8, the tongue portion (referred to below as the inside tongue portion) provided to the side face base cloth is formed shorter than the tongue portion (referred to below as the outside tongue portion) provided to the one main base cloth that is disposed on the vehicle width direction outside in the inflated and deployed state of the side airbag. Since the inside tongue portion is more readily pushed out to the outside of the side airbag by expansion of the side face base cloth due to the increase in the internal pressure of the chest chamber, the inside tongue portion is formed shorter than the outside tongue portion, thereby enabling the vent hole portion to be opened up properly.

Advantageous Effects of Invention

As described above, the vehicle side airbag device of the present invention is capable of both enhancing initial restraint performance of the side airbag and lessening the load to the chest of the occupant with a simple configuration.

BRIEF DESCRIPTION OF DRAWINGS

FIG. 5A illustrates an initial restraint state, FIG. 5B illustrates an intermediate restraint state, and FIG. 5C illustrates a later restraint state.

FIG. 6A illustrates an initial restraint state, FIG. 6B illustrates an intermediate restraint state, and FIG. 6C illustrates a later restraint state.

FIG. 8A illustrates an initial restraint state, FIG. 8B illustrates an intermediate restraint state, and FIG. 8C illustrates a later restraint state.

FIG. 9A illustrates an initial restraint state, and FIG. 9B illustrates an intermediate restraint state, and FIG. 9C illustrates a later restraint state.

BEST MODE FOR CARRYING OUT THE INVENTION

First Exemplary Embodiment

Explanation follows regarding a vehicle side airbag device 10 (referred to below simply as the side airbag device 10) according to a first exemplary embodiment of the present invention, with reference to FIG. 1 to FIG. 6. Note that in each of the drawings, the arrow FR indicates the vehicle front direction, the arrow UP indicates the vehicle upwards direction, and the arrow IN indicates the vehicle width direction inside as appropriate.

Figure 1:
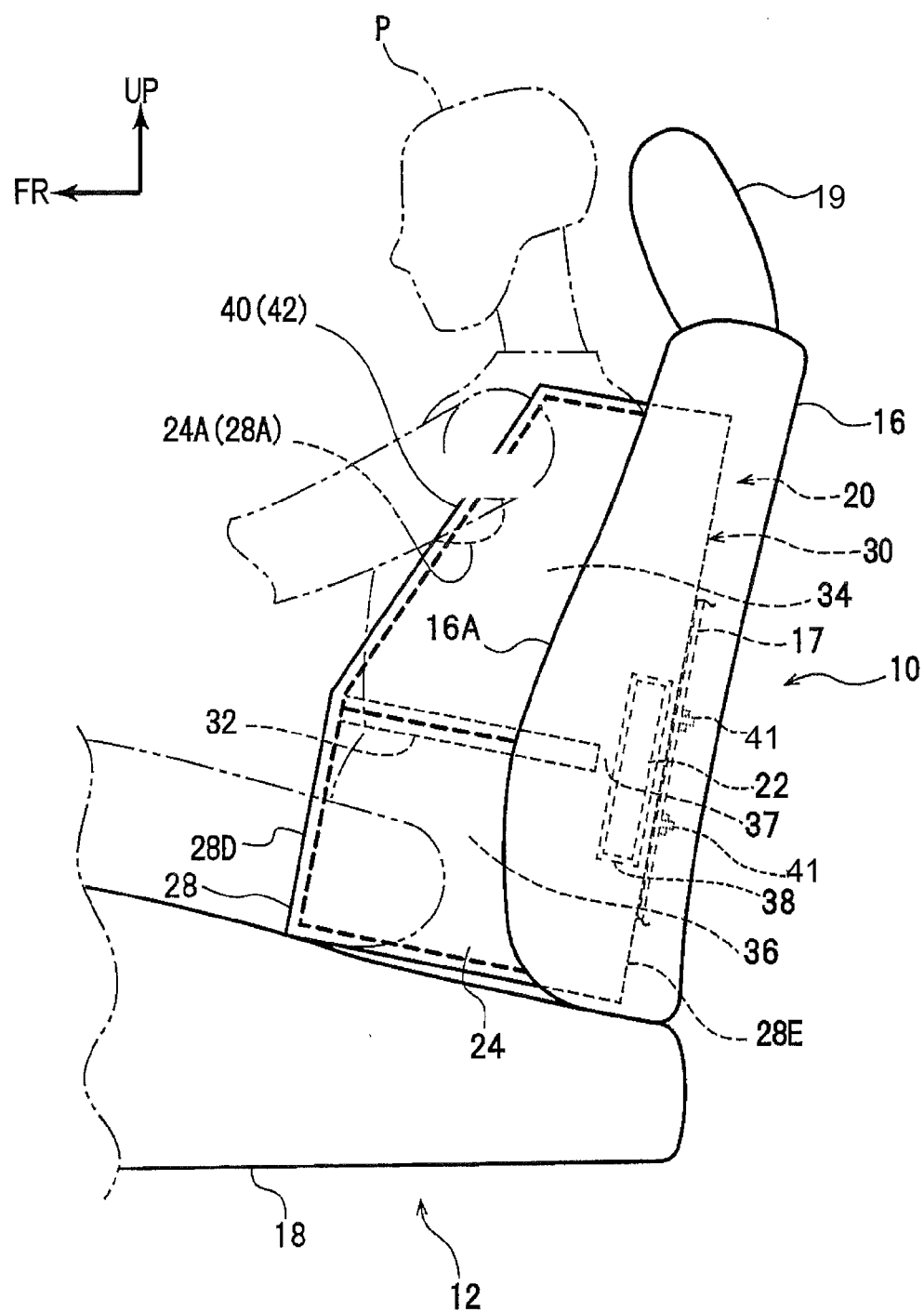
FIG. 1 is a side face view illustrating a configuration of relevant portions of a vehicle seat installed with a vehicle side airbag device according to a first exemplary embodiment of the present invention.

As illustrated in FIG. 1, the side airbag device 10 of the first exemplary embodiment is installed to a door-side side portion 16A (a side portion on a side door side, not illustrated in the drawings) of a seatback 16 of a vehicle seat 12. The seatback 16 is reclinably coupled to a rear end portion of a seat cushion 18, and a headrest 19 is coupled to an upper end portion of the seatback 16. Note that in the present exemplary embodiment, the front direction, upwards direction and the width direction of the vehicle seat 12 correspond to the front direction, the upwards direction, and the width direction of the vehicle.

The side airbag device 10 includes a side airbag 20, and an inflator 22 that serves as a gas supply means and that generates gas inside the side airbag 20. In a folded state, the side airbag 20 is configured as a unit together with components including the inflator 22, and is installed inside the door-side side portion 16A. Note that FIG. 1 illustrates a state in which the side airbag 20 has been inflated and deployed by the pressure of gas generated by the inflator 22 (a deployment completion state). Although omitted from illustration in the drawings, a seatback pad (urethane pad) that is covered by a seat cover is disposed at the periphery of the side airbag device 10, with the seatback pad and a stitching portion of the seat cover configured so as to split open during inflation and deployment of the side airbag 20.

Figure 2:
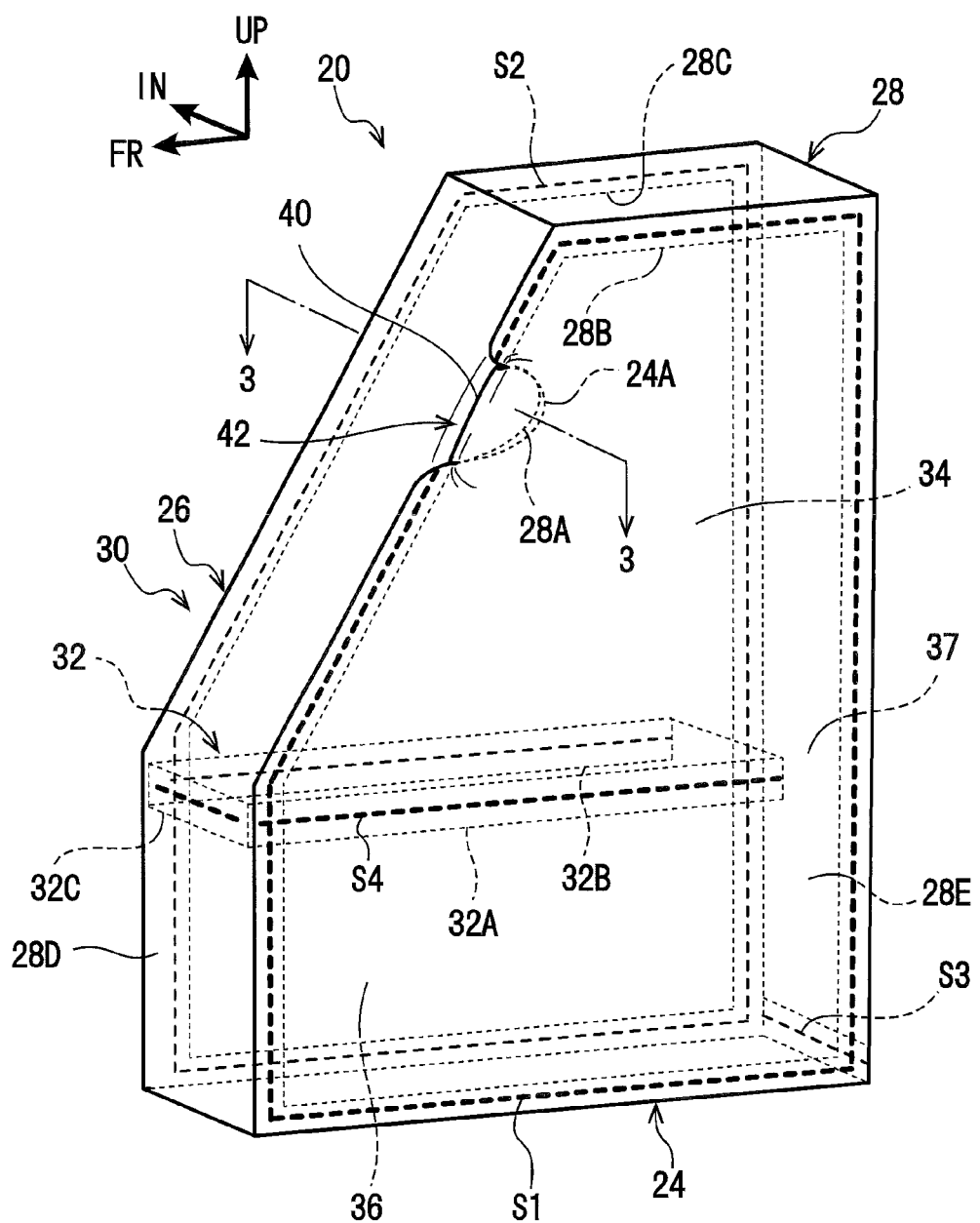
FIG. 2 is a perspective view illustrating a side airbag that is a configuration member of the side airbag device illustrated in FIG. 1.

As illustrated in FIG. 2, the side airbag 20 is what is known as a dual chamber 3D side airbag, and is configured including an airbag main body portion 30 that is formed in a bag shape by stitching together a pair of main panels 24, 26 (main base cloths) and a side face panel 28 (side face base cloth). The pair of main panels 24, 26 are each configured in an elongated substantially rectangular shape (pentagonal shape), and are disposed in a mutually facing state. The side face panel 28 is formed in a belt shape (long, thin rectangular shape), with one long side edge portion 28B stitched to a peripheral edge portion of the one main panel 24 at a stitching portion S1. The other long side edge portion 28C is stitched to a peripheral edge portion of the other main panel 26 at a stitching portion S2. Both length direction end edge portions of the side face panel 28 are moreover stitched together at a stitching portion S3. The airbag main body portion 30 (airbag bag body) is thus formed in a flattened box-form bag shape by the pair of main panels 24, 26 and the side face panel 28.

In the inflated and deployed state (see FIG. 2) of the airbag main body portion 30, the pair of main panels 24, 26 are in a state facing each other along the vehicle width direction with the length direction of the main panels 24, 26 running in the seatback 16 up-down direction. Moreover, in the inflated and deployed state, the one main panel 24 faces a door trim 39 (see FIG. 5A to FIG. 5C) of a side door that is a vehicle body side portion, and the other main panel 26 is configured so as to face an occupant P (see FIG. 1). Note that in the following explanation, reference to the front-rear direction, the up-down direction, and the width direction of the side airbag 20 are directions in the inflated and deployed state illustrated in FIG.

1 and FIG. 2, and substantially correspond to the front-rear direction, up-down direction, and width direction of the vehicle.

A tether 32 (separating wall cloth/dividing wall cloth) is provided inside the airbag main body portion 30. The tether 32 is formed in a long, thin rectangular shape, and is disposed so as to be slightly towards the lower side of an up-down direction central portion of the inside of the airbag main body portion 30 in a state in which the tether 32 length direction runs along the airbag main body portion 30 front-rear direction and the tether 32 thickness direction runs in the airbag main body portion 30 up-down direction. One long side edge portion 32A of the tether 32 is stitched together with the one main panel 24 at a stitching portion S4, and the other long side edge portion 32B is stitched together with the other main panel 26 at the stitching portion S4. One short side edge portion 32C of the tether 32 is stitched together with a front face portion 28D (a location configuring a front face of the airbag main body portion 30) at the stitching portion S4. The inside of the airbag main body portion 30 is thereby partitioned into a chest chamber 34 (upper chamber) and a waist chamber 36 (lower chamber) by the tether 32.

A communication portion 37 (gap) that places the chest chamber 34 and the waist chamber 36 in communication with each other is formed between the tether 32 described above and a rear face portion 28E (a location configuring a rear face of the airbag main body portion 30) of the side face panel 28. The inflator 22 is disposed in the communication portion 37 as illustrated in FIG. 1.

The inflator 22 is formed in a circular column shape, and is disposed with axial direction in a state running along the seatback 16 up-down direction. The inflator 22 is inserted inside a tube shaped retainer 38, and is fixed inside the retainer 38 by means such as crimping. A pair of upper and lower stud bolts 41 project out from an outer peripheral portion of the retainer 38 towards the vehicle rear side. The stud bolts 41 penetrate the rear face portion 28E of the side face panel 28 and also penetrate a side frame 17 of a seatback frame. Nuts are screwed onto leading end sides of the stud bolts 41. The retainer 38 is thereby fixed to the side frame 17, with the side airbag 20 fixed to the side frame 17 by the retainer 38.

An airbag ECU and an airbag sensor (neither of which are illustrated in the drawings) that are installed to the vehicle are electrically connected to the inflator 22 described above. Based on a detection signal from the airbag sensor, the airbag ECU determines whether or not to actuate the side airbag device 10 in the event of the vehicle being involved in for example a side-on collision or a rollover. When determination is affirmative, a specific current is passed through the inflator 22. The inflator 22 is thereby actuated, and gas is ejected from a gas ejection opening, not illustrated in the drawings, provided at a lower end side of the inflator 22.

The gas ejected from the inflator 22 flows through an upper end opening portion of the retainer 38 and into the chest chamber 34, and also flows through a lower end opening portion of the retainer 38 and into the waist chamber 36. Namely, the retainer 38 functions as a diffuser that distributes the gas ejected from the inflator 22 to the chest chamber 34 and the waist chamber 36. As illustrated in FIG. 1, the airbag main body portion 30 (side airbag 20) thereby inflates and deploys towards the front direction and in the up-down direction of the seatback 16 so as to be present between a side portion of the occupant P and the door trim 39 of the side door.

Specifically, the chest chamber 34 inflates and deploys between the chest of the occupant P and the door trim 39, and the chest chamber 34 restrains the chest of the occupant P. The waist chamber 36 inflates and deploys between the waist of the occupant P and the door trim 39, and the waist chamber 36 restrains the waist of the occupant P. Due to disposing the gas ejection opening of the inflator 22 facing downwards, configuration is made such that the waist chamber 36 completes deployment earlier than the chest chamber 34, and the internal pressure of the waist chamber 36 is relatively higher than the internal pressure of the chest chamber 34.

Relevant Portions of the First Exemplary Embodiment

Figure 3:
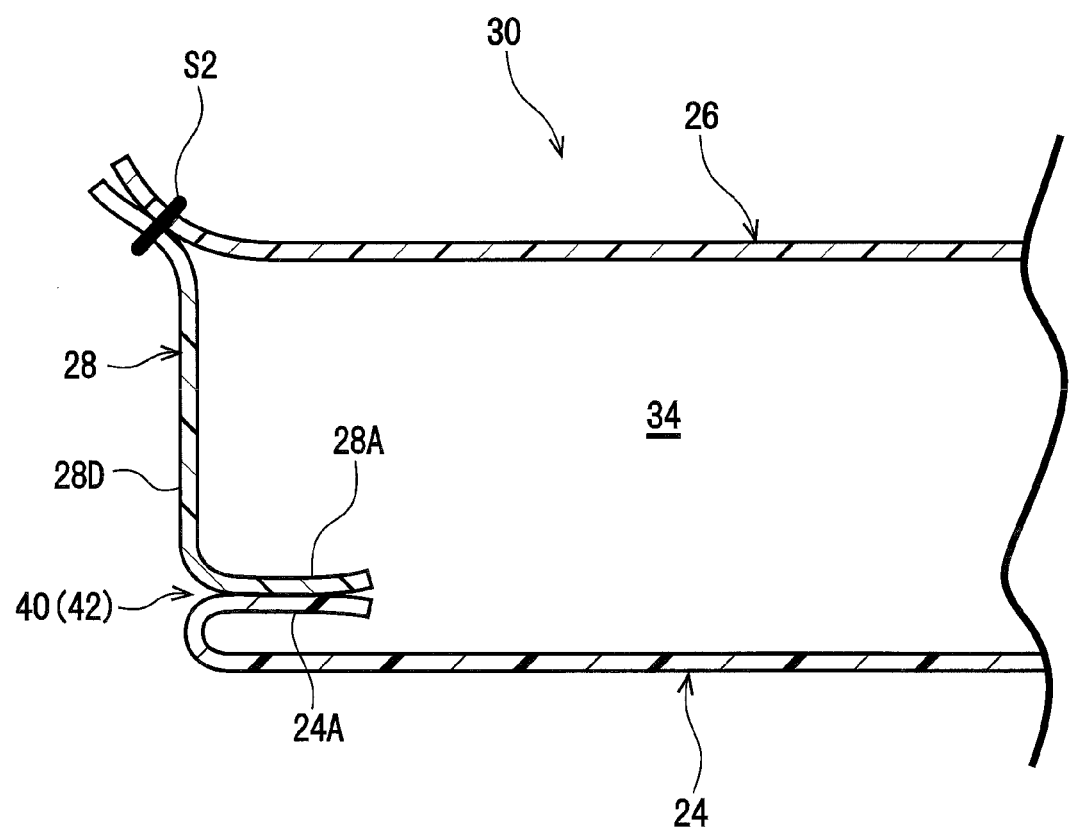
FIG. 3 is an enlarged plan view cross-section taken along line 3-3 in FIG. 2.
Figure 4:
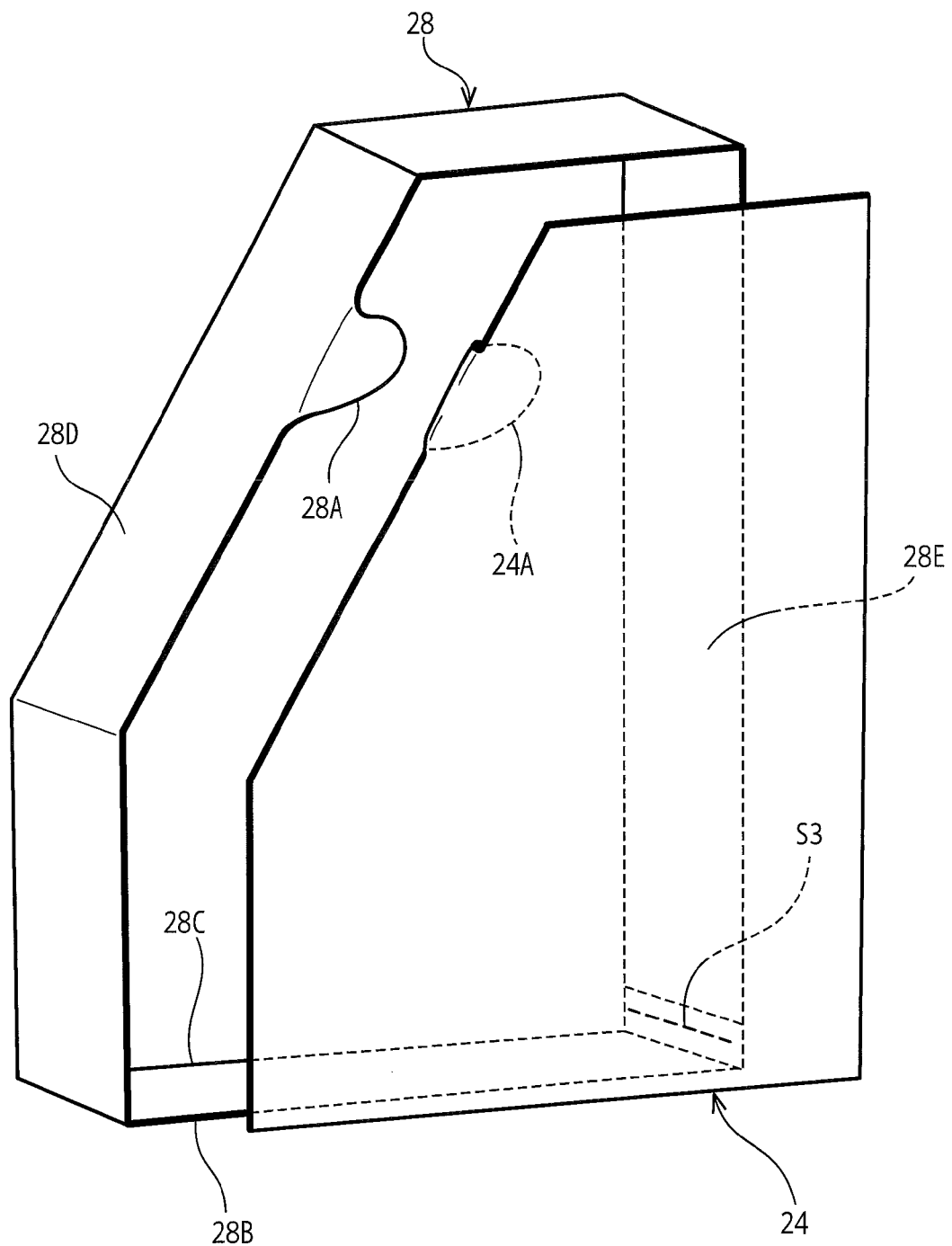
FIG. 4 is an exploded perspective view illustrating a configuration of one main panel and a side face panel that are illustrated in FIG. 2.

As illustrated in FIG. 2 and FIG. 3, in the present exemplary embodiment a vent hole portion 40 is provided to the side airbag 20 by interrupting a portion of the stitching portion S1. More specifically, the stitching portion S1 is interrupted in the vicinity of an up-down direction central portion of the front end portion of the chest chamber 34, thereby providing a stitching interruption portion 42 (non-stitched portion). The one main panel 24 and the side face panel 28 are not stitched together at the stitching interruption portion 42, thereby forming the slit shaped vent hole portion 40 that places the chest chamber 34 inside in communication with the airbag main body portion 30 outside (side airbag 20 exterior). The vent hole portion 40 extends substantially in the up-down direction at a seat width direction outside edge portion of the side airbag 20 in the inflated and deployed state of the side airbag 20.

Moreover, in the present exemplary embodiment, flaps 24A, 28A that serve as respective tongue portions extend out integrally from peripheral edge portions of the main panel 24 and the side face panel 28 that are adjacent on either side of the vent hole portion 40. The flap 24A provided to the main panel 24 is formed by cutting a portion of the peripheral edge portion of the main panel 24 in a tongue shape when cutting a cloth member that is the material of the main panel 24 using for example laser processing (see FIG. 4). The flap 28A provided to the side face panel 28 is formed by cutting a portion of the peripheral edge portion of the side face panel 28 into a tongue shape when cutting a cloth member that is the material for the side face panel 28 using for example laser processing (see FIG. 4). In the present exemplary embodiment, the flaps 24A, 28A are formed with semicircular profiles, and the extension lengths of the flaps 24A, 28A from the respective peripheral edge portions of the main panel 24 and the side face panel 28 are set with the same length dimensions as each other. The flaps 24A, 28A are formed with width dimensions the same as, or slightly shorter than, the length dimension of the vent hole portion 40. The flaps 24A, 28A are inserted inside the chest chamber 34 through the vent hole portion 40, and face each other inside the chest chamber 34 (see FIG. 3).

Figure 5A:
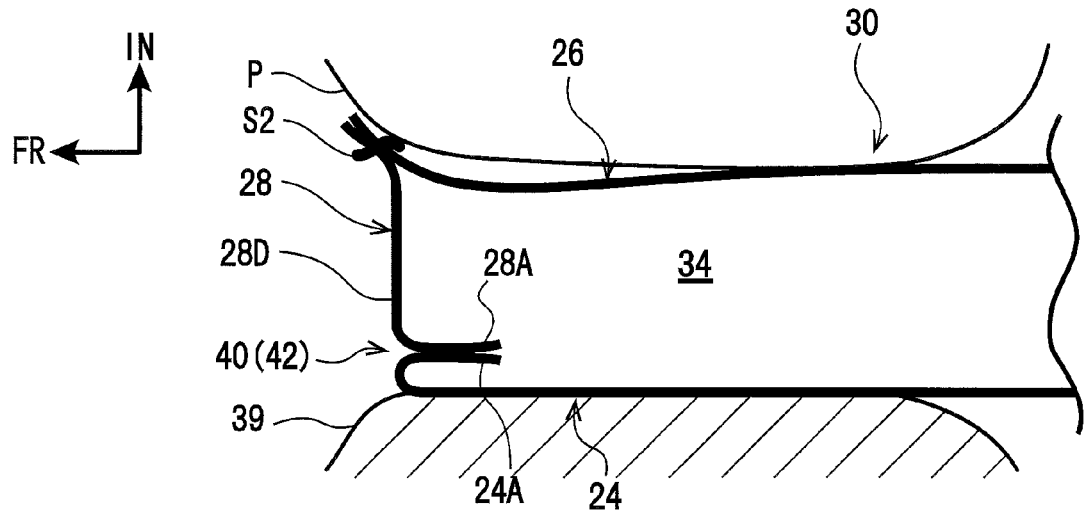
FIG. 5A to FIG. 5C are plan view cross-sections corresponding to FIG. 3.
Figure 6A:
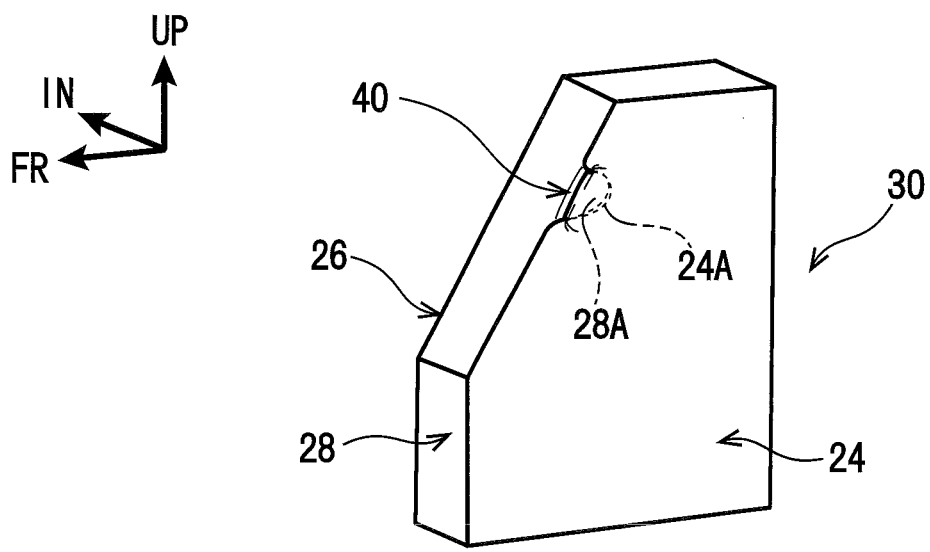
FIG. 6A to FIG. 6C are schematic perspective views corresponding to FIG. 2.

The flaps 24A, 28A described above are configured so as to close off the vent hole portion 40 by the internal pressure of the chest chamber 34 at least until the side airbag 20 has inflated and deployed between the occupant P and the door trim 39. Namely, the length dimensions of the respective flaps 24A, 28A are set such that the flaps 24A, 28A are not pushed out through the vent hole portion 40 to the outside of the airbag main body portion 30 by the increasing internal pressure of the chest chamber 34 due to the supply of gas from the inflator 22. Accordingly, as illustrated in FIG. 5A and FIG. 6A, when the occupant P is first restrained by the side airbag 20 (initial restraint: initial bag deployment), the respective flaps 24A, 28A are configured so as to be positioned inside the chest chamber 34. In this state, the flaps 24A, 28A are superimposed on each other (are mutually pressed against each other) by the internal pressure of the chest chamber 34, such that the flaps 24A, 28A close off the vent hole portion 40.

Escape of gas through the vent hole portion 40 is thereby prevented or effectively suppressed.

Figure 5B:
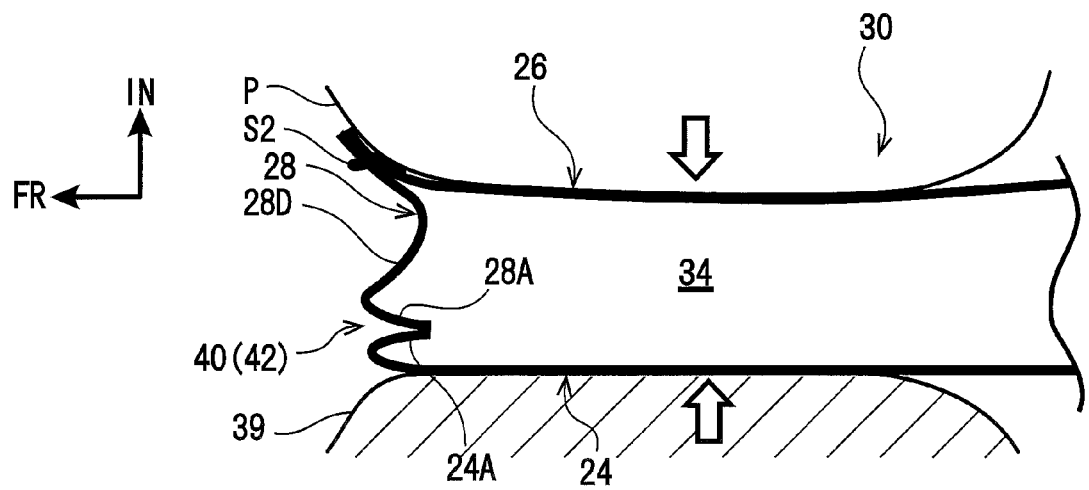
Figure 5C:
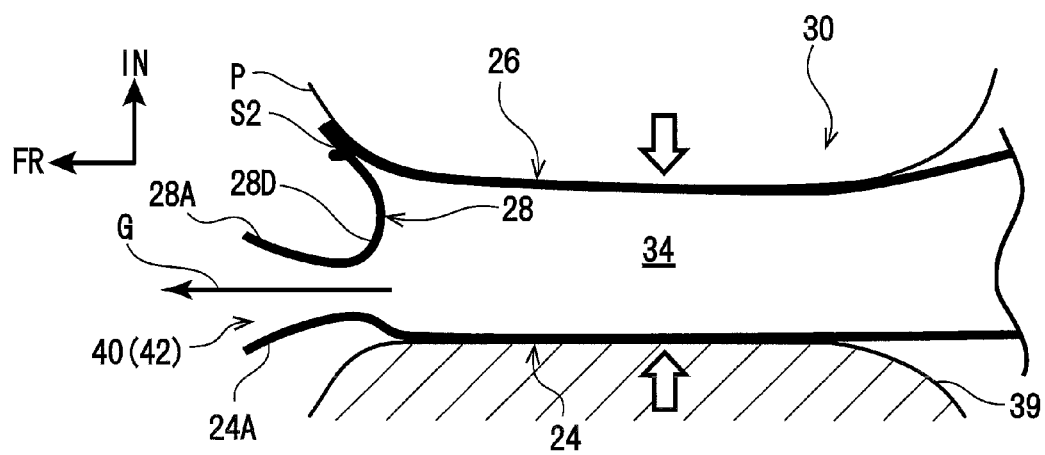
Figure 6B:
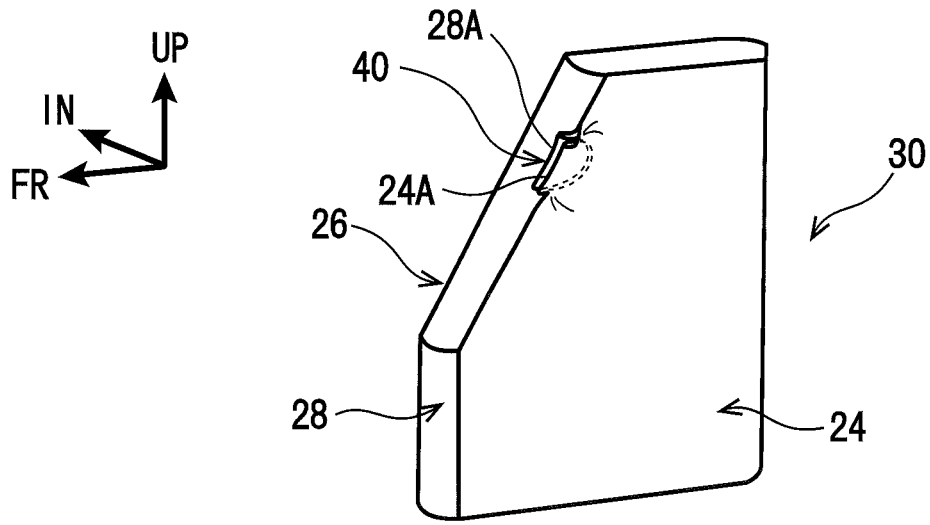
Figure 6C:
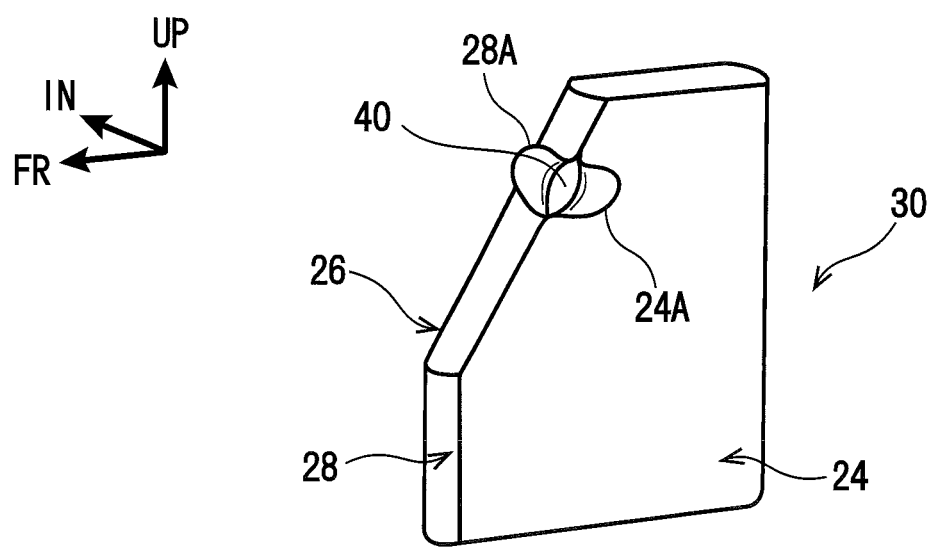

However, in an intermediate restraint stage after a specific duration has elapsed since the initial restraint stage, the side airbag 20 is compressed in the vehicle width direction between the occupant P who, due to the impact of the side-on collision, is attempting to move towards the vehicle width direction outside under inertia, and the door trim 39 that has started to intrude in towards the vehicle width direction inside (see FIG. 5B and FIG. 6B). Due to this compression, there is a sudden increase in the internal pressure of the chest chamber 34 and the waist chamber 36, such that in a later restraint stage, the flaps 24A, 28A are pushed out to the outside of the airbag main body portion 30 (see FIG. 5C and FIG. 6C) accompanying the increase in internal pressure of the chest chamber 34. Namely, the flaps 24A, 28A are pushed out from the chest chamber 34 due to a pressing force applied to the flaps 24A, 28A by the internal pressure of the chest chamber 34 becoming greater than a frictional force acting on the flaps 24A, 28A. As a result, closing off of the vent hole portion 40 by the flaps 24A, 28A is released, opening up the vent hole portion 40. A configuration is thereby achieved in which gas inside the chest chamber 34 is expelled to outside the airbag main body portion 30 through the vent hole portion 40 (see arrow G in FIG. 5C). Note that when this occurs, the gas expelled from the vent hole portion 40 is expelled towards the vehicle front side (a side getting further away from the occupant P) due to providing the vent hole portion 40 at the front end side of the chest chamber 34.

Operation and Advantageous Effects

Next, explanation follows regarding operation and advantageous effects of the present exemplary embodiment.

In the side airbag device 10 configured as above, the flaps 24A, 28A close off the vent hole portion 40 by the internal pressure of the chest chamber 34 at least until the side airbag 20 has inflated and deployed between the occupant P and the door trim 39. Since the gas inside the airbag main body portion 30 can thereby be prevented or suppressed from being expelled through the vent hole portion 40 to the airbag main body portion 30 outside, the internal pressure of the chest chamber 34 and the waist chamber 36 can be made to increase quickly. As a result, the initial restraint performance of the side airbag 20 can be enhanced since the chest chamber 34 and the waist chamber 36 can be inflated and deployed quickly.

After the side airbag 20 has inflated and deployed between the occupant P and the door trim 39, the chest chamber 34 and the waist chamber 36 are compressed between the occupant P and the door trim 39 by the impact of the side-on collision. The flaps 24A, 28A are pushed out to the outside of the airbag main body portion 30 when the internal pressure of the chest chamber 34 increases due to this compression. As a result, closing off of the vent hole portion 40 by the flaps 24A, 28A is released and the vent hole portion 40 is opened up, thereby expelling gas inside the chest chamber 34 to the airbag main body portion 30 outside through the vent hole portion 40. The internal pressure of the chest chamber 34 accordingly decreases, thereby lessening a load from the chest chamber 34 that is received by the chest of the occupant P.

Moreover, in the present exemplary embodiment, a simple and low cost configuration can be achieved for the vent hole portion 40 due to providing the vent hole portion 40 by interrupting a portion of the stitching of the stitching portion S1 of the side airbag 20. Opening and closing of the vent hole portion 40 can also be controlled with a simple configuration since the vent hole portion 40 is closed off and opened up by the flaps 24A, 28A that extend out from the peripheral edge portions of the one main panel 24 and the side face panel 28. A reduction in costs can accordingly be achieved.

In the present exemplary embodiment, since the flaps 24A, 28A are inserted (housed) inside the chest chamber 34 until the side airbag 20 has inflated and deployed, as described above, the flaps 24A, 28A can be protected even when for example the door trim 39 is damaged by the impact of a side-on collision. Namely, the vent hole portion 40 could for example be closed off by stitching the flaps 24A, 28A with a weak thread in a configuration in which the flaps 24A, 28A are not inserted inside the chest chamber 34, however in such a configuration, there is a possibility that for example the damaged door trim 39 may impinge on the flaps 24A, 28A (for example, the flaps 24A, 28A may become trapped in the broken door trim 39), thereby impeding opening up of the vent hole portion 40. Regarding this issue, in the present exemplary embodiment the vent hole portion 40 can be opened up properly since the flaps 24A, 28A can be protected.

In the present exemplary embodiment, the side airbag 20 is configured by what is known as a dual chamber 3D side airbag, enabling the thickness dimension (bag thickness) of the side airbag 20 along the vehicle width direction in the inflated and deployed state to be made thicker by the amount of the side face panel 28. The impact absorption stroke of the side airbag 20 can accordingly be made larger, thereby enabling occupant protection performance to be enhanced.

Moreover, in the present exemplary embodiment the vent hole portion 40 is provided by interrupting a portion of the stitching portion S1 that is disposed on the vehicle width direction outside in the inflated and deployed state of the side airbag 20. Due to the vent hole portion 40 being disposed on the opposite side of the side airbag 20 to the occupant in the inflated and deployed state, any effect on the occupant P due to high temperature gas being expelled from the vent hole portion 40 can be alleviated.

In the present exemplary embodiment, the vent hole portion 40 is formed in a slit shape, and the vent hole portion 40 extends substantially in the up-down direction at a vehicle width direction outside end portion of the side airbag 20 in the inflated and deployed state of the side airbag 20. The vent hole portion 40 can accordingly be opened up properly even in a narrow gap when the gap between the door trim 39 that has advanced towards the vehicle width direction inside and the occupant P has become narrower. Namely, when a vent hole portion is configured by for example what is known as a tube vent, it becomes difficult for the vent hole portion to open up in a narrow gap such as described above, however in the present exemplary embodiment the vent hole portion 40 can open up properly even in a narrow gap. Such a configuration is therefore particularly effective in a side airbag device.

In the present exemplary embodiment, the flaps 24A, 28A are respectively provided to both the one main panel 24 and the side face panel 28. The pair of flaps 24A, 28A are inserted inside the chest chamber 34 through the vent hole portion 40, and are configured so as to face mutually each other inside the chest chamber 34. During actuation of the inflator 22, the pair of flaps 24A, 28A are thereby superimposed on each other by the internal pressure of the chest chamber 34, enabling the vent hole portion 40 to be closed off properly.

In the present exemplary embodiment, the flaps 24A, 28A are formed with semicircular profiles. The flaps 24A, 28A can accordingly be prevented from becoming caught on edge portions of the vent hole portion 40 as the flaps 24A, 28A are being pushed out to the outside of the airbag main body portion 30 accompanying the increase in internal pressure of the chest chamber 34. As a result, the vent hole portion 40 can be opened up in a stable manner since the flaps 24A, 28A can be pushed out smoothly to the outside of the airbag main body portion 30.

Supplementary Explanation of the First Exemplary Embodiment

In the first exemplary embodiment, the flaps 24A, 28A are configured with the same length dimensions as each other, however there is no limitation thereto, and configuration may be made such that the flap 28A is formed shorter than the flap 24A. Namely, the flap 28A is more readily pushed out to the outside of the chest chamber 34 due to the chest chamber 34 inflating and the side face panel 28 expanding towards the vehicle front side. The vent hole portion 40 can accordingly be opened up properly by forming the flap 28A shorter than the flap 24A.

In the first exemplary embodiment, configuration is made wherein the flap 24A (tongue portion) provided to the main panel 24 (main base cloth) and the flap 28A (tongue portion) provided to the side face panel 28 (side face base cloth) mutually face each other inside the chest chamber 34, however the invention according to claim 1 to claim 3 is not limited thereto, and configuration may be made in which the tongue portion is only provided to one out of either the main base cloth or the side face base cloth.

In the first exemplary embodiment, configuration is made wherein the inside of the airbag main body portion 30 is partitioned into the chest chamber 34 and the waist chamber 36, however the invention according to claim 1 to claim 8 is not limited thereto, and configuration may be made wherein the inside of the airbag main body portion is partitioned into 3 or more chambers. For example, configuration may be made in which for example another chamber (shoulder chamber) is provided above the chest chamber. This point also applies with respect to the second exemplary embodiment that is described below.

Second Exemplary Embodiment

Next, explanation follows regarding a second exemplary embodiment of the present invention. Note that configurations and operation that are basically the same as those of the first exemplary embodiment are allocated the same reference numerals, and explanation thereof is omitted.

Figure 7:
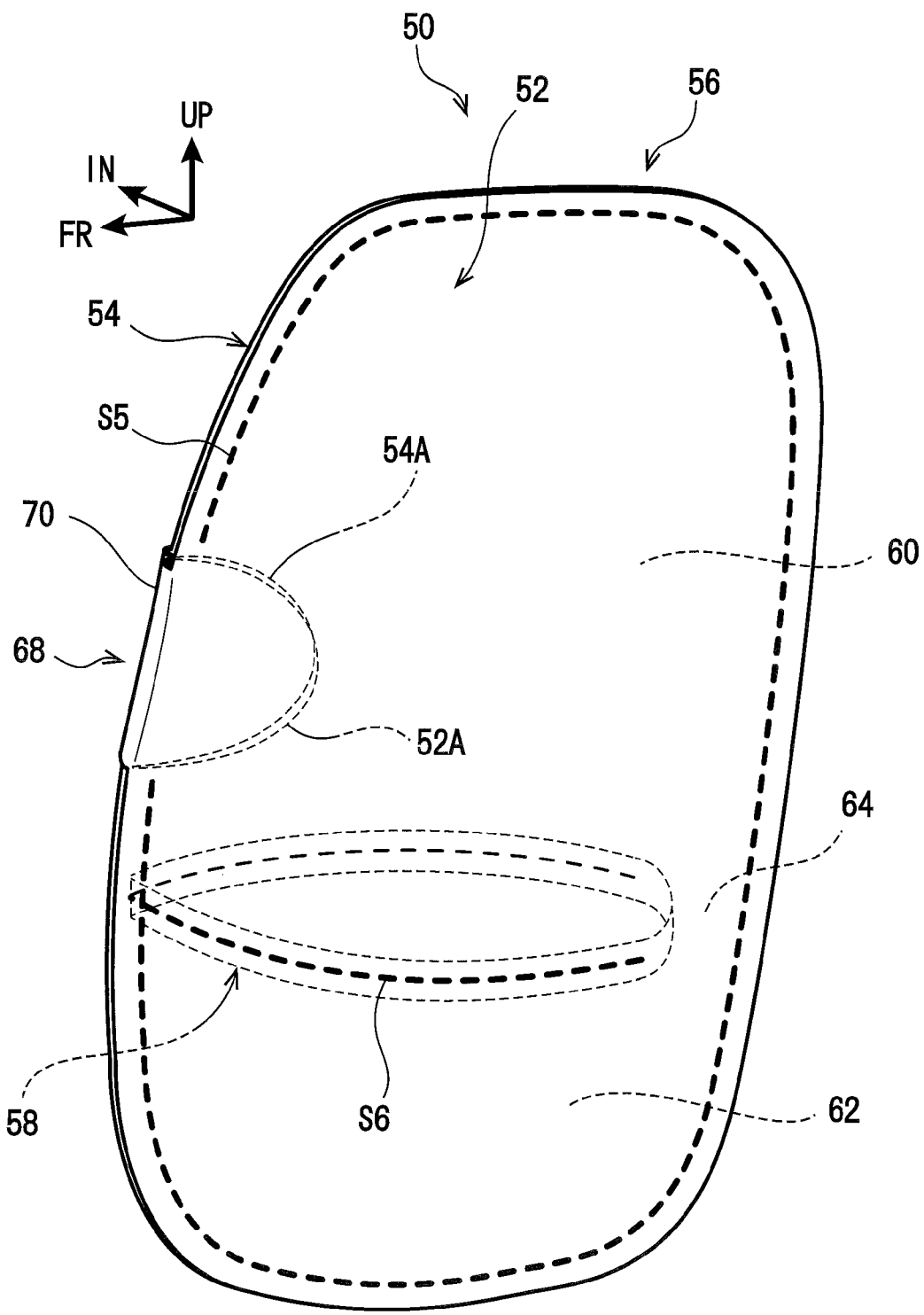
FIG. 7 is a perspective view illustrating a side airbag that is a configuration member of a vehicle side airbag device according to a second exemplary embodiment of the present invention.

FIG. 7 is a perspective view illustrating a side airbag 50 that is a configuration member of a vehicle side airbag device according to the second exemplary embodiment of the present invention. The present exemplary embodiment is basically of similar configuration to the first exemplary embodiment. However, in the present exemplary embodiment the side airbag 50 is configured by what is known as a dual chamber 2D side airbag. The side airbag 50 includes an airbag main body portion 56 formed by stitching together a pair of panels 52, 54 (base cloths). The pair of panels 52, 54 are both formed with elliptical profiles, and peripheral edge portions thereof are stitched together at a stitching portion S5 in a superimposed state of the panels 52, 54. The bag-shaped airbag main body portion 56 is thus formed.

In an inflated and deployed state of the airbag main body portion 56, as illustrated in FIG. 7, the pair of panels 52, 54 face each other in the vehicle width direction, with the length direction of the pair of panels 52, 54 in a state running along the seatback 16 up-down direction. Moreover, configuration is made such that in this inflated and deployed state, one panel 52 faces the door trim 39, and the other panel 54 faces the occupant P. Note that the front-rear direction, up-down direction and width direction of the side airbag 50 referred to in the following explanation are directions in the inflated and deployed state described above, and substantially correspond to the front-rear direction, up-down direction and width direction of the vehicle.

A tether 58 (separating wall cloth/dividing wall cloth) is provided inside the airbag main body portion 56. The tether 58 is formed in an elliptical shape with the tether 58 length direction running along the airbag main body portion 56 front-rear direction and the tether 58 thickness direction running in the airbag main body portion 56 up-down direction. The tether 58 is disposed inside the airbag main body portion 56 slightly to the lower side of an up-down direction central portion. A peripheral edge portion of the tether 58 is stitched to the pair of panels 52, 54 at a stitching portion S6. The inside of the airbag main body portion 56 is thereby partitioned into a chest chamber 60 (upper chamber) and a waist chamber 62 (lower chamber) by the tether 58.

A communication portion 64 (gap) that places the chest chamber 60 in communication with the waist chamber 62 is formed between the tether 58 and a rear end portion of the airbag main body portion 56. An inflator 22 and a retainer 38 (neither of which are illustrated in FIG. 7) are disposed in the communication portion 64. The inflator 22 and the retainer 38 are similar in configuration to the inflator 22 and the retainer 38 of the first exemplary embodiment, and the retainer 38 and the side airbag 50 are fixed to the side frame 17 by screwing nuts onto stud bolts 41 that penetrate a rear end side of the airbag main body portion 56 and the side frame 17.

The gas ejected from the inflator 22 flows inside the chest chamber 60 through an upper end opening portion of the retainer 38, and also flows inside the waist chamber 62 through a lower end opening portion of the retainer 38. The side airbag 50 accordingly inflates and deploys between a side portion of the occupant P and the door trim 39 such that the chest chamber 60 is present between the chest of the occupant P and the door trim 39, and such that the waist chamber 62 is present between the waist of the occupant P and the door trim 39. Note that in the present exemplary embodiment, configuration is made such that the waist chamber 62 completes deployment earlier than the chest chamber 60, and the internal pressure of the waist chamber 62 is higher than the internal pressure of the chest chamber 60.

Relevant Portions of the Second Exemplary Embodiment

In the present exemplary embodiment, a stitching interruption portion 68 (non-stitched portion) is provided by interrupting the stitching portion S5 in the vicinity of an up-down direction central portion of a front end portion of the chest chamber 60. The pair of panels 52, 54 are not stitched together at the stitching interruption portion 68, thereby forming a vent hole portion 70 that places the chest chamber 60 inside in communication with the airbag main body portion 56 outside.

In the present exemplary embodiment, flaps 52A, 54A that serve as respective tongue portions extend out integrally from peripheral edge portions of the pair of panels 52, 54 (the pair of base cloths adjacent on either side of the vent hole portion 70). The flaps 52A, 54A are basically similar in configuration to the flaps 24A, 28A of the first exemplary embodiment, and are inserted inside the chest chamber 60 through the vent hole portion 70. The flaps 52A, 54A face each other inside the chest chamber 60.

Figure 8A:
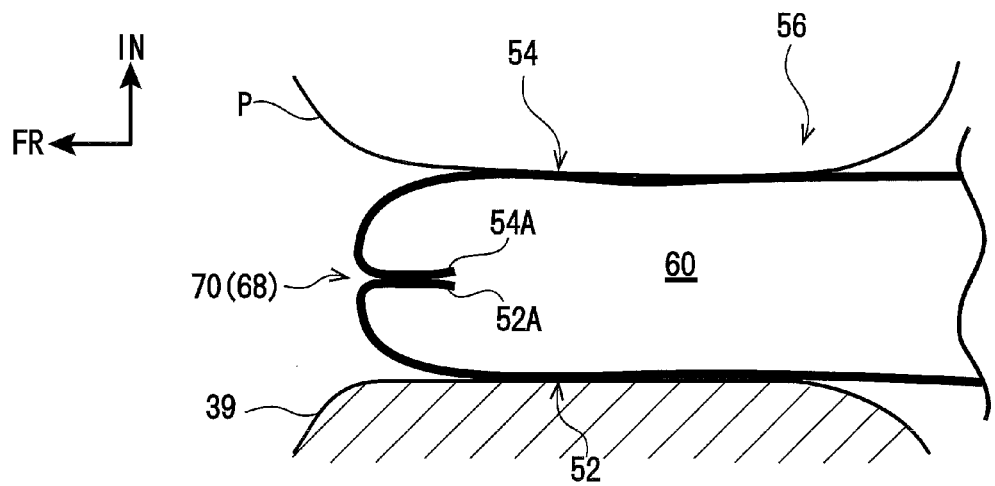
FIG. 8A to FIG. 8C are plan view cross-sections of the side airbag illustrated in FIG. 7.
Figure 9A:
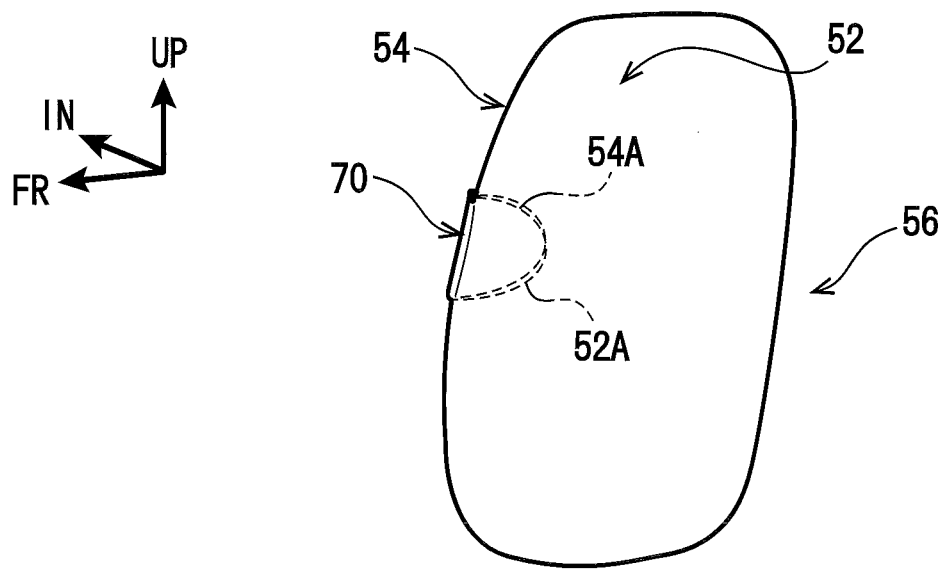
FIG. 9A to FIG. 9C are perspective views corresponding to FIG. 7.

The flaps 52A, 54A are configured so as to close off the vent hole portion 70 by the internal pressure of the chest chamber 60 at least until the side airbag 50 has inflated and deployed between the occupant P and the door trim 39. Namely, when the occupant P is first restrained by the side airbag 50 (initial restraint), as illustrated in FIG. 8A and FIG. 9A, the respective flaps 52A, 54A are positioned inside the chest chamber 60. In this state, the vent hole portion 70 is closed off by the flaps 52A, 54A due to the flaps 52A, 54A being superimposed on each other by the internal pressure of the chest chamber 60. Escape of gas through the vent hole portion 70 is thereby prevented or effectively suppressed.

Figure 8B:
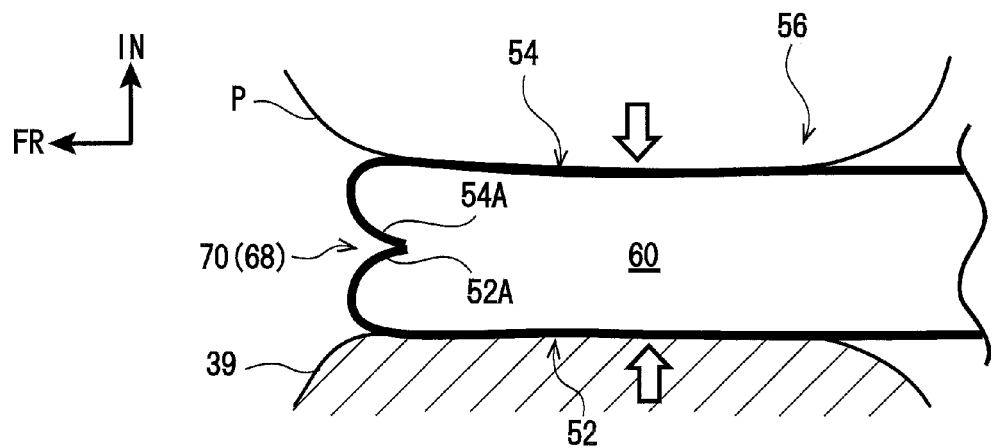
Figure 8C:
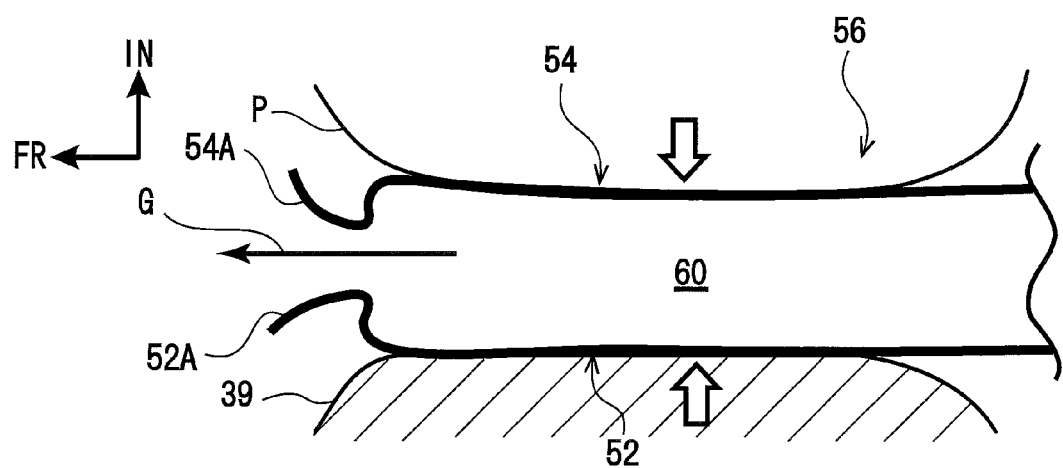
Figure 9B:
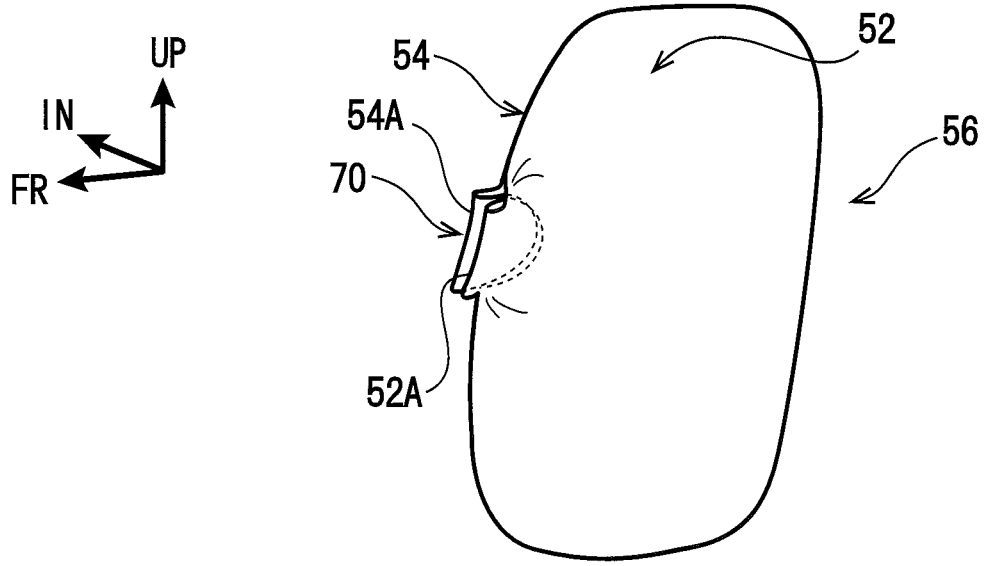
Figure 9C:
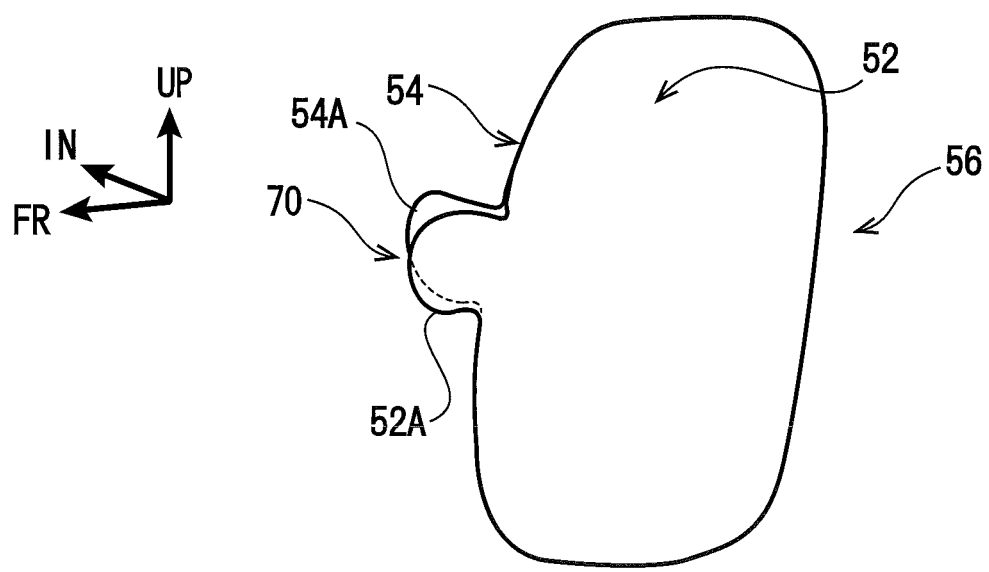

However, during intermediate restraint the side airbag 50 is compressed between the occupant P and the door trim (see FIG. 8B and FIG. 9B), such that there is a sudden increase in the internal pressure of the chest chamber 60 and the waist chamber 62. During later restraint, the flaps 52A, 54A are therefore pushed out to the outside of the side airbag accompanying the increase in the internal pressure of the chest chamber (see FIG. 8C and FIG. 9C). As a result, closing off of the vent hole portion 70 by the flaps 52A, 54A is released, opening up the vent hole portion.

The present exemplary embodiment basically exhibits similar operation and advantageous effects to the first exemplary embodiment. Moreover, in the present exemplary embodiment the airbag main body portion 56 is formed by the pair of panels 52, 54, thus enabling a simple configuration to be achieved for the airbag main body portion 56.

Supplementary Explanation of each of the Exemplary Embodiments

In each of the exemplary embodiments described above, the flaps 24A, 28A, 52A, 54A (tongue portions) are formed with semicircular profiles, however the invention according to claim 1 to claim 6 is not limited thereto, and the profile of the tongue portions may be modified as appropriate. However, it is preferable for at least the leading end sides of the tongue portions to be formed with semicircular profiles in order that the tongue portions are pushed out smoothly from the chest chamber.

Moreover, in the second exemplary embodiment, configuration is made in which the flaps 52A, 54A (tongue portions) provided to the panels 52, 54 (base cloths) mutually face each other inside the chest chamber 60, however the invention according to claim 5 is not limited thereto, and configuration may be made wherein a tongue portion is only provided to either one out of the pair of base cloths.

In the first exemplary embodiment, the flap 24A is extends out integrally from the main panel 24, and the flap 28A extends out integrally from the side face panel 28. In the second exemplary embodiment, configuration is made wherein the flaps 52A, 54A extend out integrally from the panels 52, 54. The invention according to claim 1 to claim 8 is however not limited thereto, and configuration may be made wherein a tongue portion formed as a separate body to a base cloth is joined (for example by stitching) to the base cloth.

In the second exemplary embodiment, configuration is made wherein the bag-shaped airbag main body portion 56 is formed by stitching together the pair of panels 52, 54, however the invention according to claim 1 and claim 2 is not limited thereto, and configuration may be made wherein a single base cloth is folded in two, and peripheral edge portions of the base cloth are stitched together except for at a fold line side where the base cloth is folded in two, thereby forming a bag-shaped airbag main body portion.

In the second exemplary embodiment, the side airbag 50 is configured including the tether 58, however the invention according to claim 5 and claim 6 is not limited thereto, and configuration may be made wherein the pair of base cloths are stitched (set with a seam) at an up-down direction intermediate portion of the airbag main body portion, thereby partitioning the inside of the airbag main body portion into a chest chamber and a waist chamber.

In each of the exemplary embodiments described above, configuration is made with the vent hole portion 40, 70 provided to the front end side of the chest chamber 34, 60, however the invention according to claim 1 to claim 8 is not limited thereto, and configuration may be made with the vent hole portion provided at the rear end side of the chest chamber. In such a configuration, gas expelled from the vent hole portion 40, 70 is expelled towards the vehicle rear side (inside the seatback), thereby further lessening any effect on the occupant due to high temperature gas.

Various other modifications may be implemented within a range not departing from the spirit of the present invention. It goes without saying that the scope of rights encompassed by the present invention is not limited by the respective exemplary embodiments that are described above.

The invention claimed is:

1. A vehicle side airbag device comprising:
   a side airbag that is formed with a bag-shaped airbag main body portion by stitching a base cloth, an inside of the airbag main body portion being partitioned into at least a chest chamber and a waist chamber;
   an inflator that supplies gas to the chest chamber inside and to the waist chamber inside in an event of a vehicle side-on collision, thereby inflating and deploying the side airbag such that the chest chamber is present between a chest of an occupant and a vehicle body side portion, and the waist chamber is present between a waist of the occupant and the vehicle body side portion;
   a vent hole portion that is provided to the side airbag by interrupting a portion of the stitching, and that places the chest chamber inside in communication with the airbag main body portion outside; and
   a pair of tongue portions that extend out integrally in a tongue shape from peripheral edge portions of the base cloth adjacent on either side of the vent hole portion, and that are inserted inside the chest chamber through the vent hole portion,
   wherein the pair of tongue portions are formed by cutting portions of the peripheral edge portions of the base cloth into the tongue shape,
   wherein the pair of tongue portions face each other inside the chest chamber, and
   wherein the pair of tongue portions are not stitched together.

2. The vehicle side airbag device of claim 1, wherein:
   the airbag main body portion is configured by
   a pair of main base cloths that face each other in a vehicle width direction in an inflated and deployed state of the side airbag, and
   a side face base cloth that is formed in a belt shape, that has one long side edge portion stitched to a peripheral edge portion of one of the main base cloths, and that has another long side edge portion stitched to a peripheral edge portion of an other main base cloth; and
   the vent hole portion is formed by interrupting a portion of the stitching between the one main base cloth, that is disposed on the vehicle width direction outside in the inflated and deployed state, and the side face base cloth.

3. The vehicle side airbag device of claim 2, wherein a first tongue portion of the pair of tongue portions provided to the one main base cloth and a second tongue portion of the pair of tongue portions provided to the side face base cloth mutually face each other inside the chest chamber.

4. The vehicle side airbag device of claim 3, wherein the second tongue portion provided to the side face base cloth is formed shorter than the first tongue portion provided to the one main base cloth.

5. The vehicle side airbag device of claim 1, wherein the airbag main body portion is configured by stitching together peripheral edge portions of a pair of base cloths that face each other in a vehicle width direction in an inflated and deployed state of the side airbag.

6. The vehicle side airbag device of claim 5, wherein a first tongue portion of the pair of tongue portions provided to one of the pair of base cloths and a second tongue portion of the pair of tongue portions provided to another of the pair of base cloths mutually face each other inside the chest chamber.

7. The vehicle side airbag device of claim 1, wherein the pair of tongue portions are formed with width dimensions that are the same as, or slightly shorter than, a length dimension of the vent hole portion.

8. A vehicle side airbag device comprising:
a side airbag that is formed with a bag-shaped airbag main body portion by stitching a base cloth with an inside of the airbag main body portion partitioned into at least a chest chamber and a waist chamber;
an inflator that supplies gas to the chest chamber inside and to the waist chamber inside in an event of a vehicle side-on collision, thereby inflating and deploying the side airbag such that the chest chamber is present between a chest of an occupant and a vehicle body side portion, and the waist chamber is present between a waist of the occupant and the vehicle body side portion;
a vent hole portion that is provided to the side airbag by interrupting a portion of the stitching, and that places the chest chamber inside in communication with the airbag main body portion outside; and
a pair of tongue portions that extend out integrally in a tongue shape from peripheral edge portions of the base cloth adjacent on either side of the vent hole portion, that is inserted inside the chest chamber through the vent hole portion, and that closes off the vent hole portion by internal pressure of the chest chamber due to the gas supplied from the inflator, and that releases the closing off by being pushed out to the outside of the airbag main body portion accompanying an increase in the internal pressure of the chest chamber due to the side airbag being compressed in a vehicle width direction in an inflated and deployed state of the side airbag,
wherein the pair of tongue portions are formed by cutting portions of the peripheral edge portions of the base cloth into the tongue shape,
wherein the pair of tongue portions face each other inside the chest chamber, and
wherein the pair of tongue portions are not stitched together.

9. The vehicle side airbag device of claim 8, wherein:
the airbag main body portion is configured by
a pair of main base cloths that face each other in a vehicle width direction in the inflated and deployed state of the side airbag, and
a side face base cloth that is formed in a belt shape, that has one long side edge portion stitched to a peripheral edge portion of one of the main base cloths, and that has another long side edge portion stitched to a peripheral edge portion of an other main base cloth; and
the vent hole portion is formed by interrupting a portion of the stitching between the one main base cloth, that is disposed on the vehicle width direction outside in the inflated and deployed state, and the other main base cloth.

10. The vehicle side airbag device of claim 8, wherein the airbag main body portion is configured by stitching together peripheral edge portions of a pair of base cloths that face each other in the vehicle width direction in the inflated and deployed state of the side airbag.

11. The vehicle side airbag device of claim 8, wherein the pair of tongue portions are formed with width dimensions that are the same as, or slightly shorter than, a length dimension of the vent hole portion.

* * * * *